United States Patent

Allen

[15] 3,675,477
[45] July 11, 1972

[54] TESTING METHOD AND DEVICE USING FILTERED ULTRA VIOLET RADIATION

[72] Inventor: Richard A. Allen, Lincoln, Mass.
[73] Assignee: Avco Corporation, Cincinnati, Ohio
[22] Filed: Oct. 29, 1970
[21] Appl. No.: 85,207

[52] U.S. Cl. .................................. 73/150, 250/51, 250/86, 350/3
[51] Int. Cl. ........................................ G01b 19/08, H01j 5/16
[58] Field of Search .................. 73/150, 432 SD; 250/51, 86; 350/3, 312

[56] References Cited

UNITED STATES PATENTS

| | | | |
|---|---|---|---|
| 2,987,914 | 6/1961 | Gunther et al. | 73/150 |
| 2,569,793 | 10/1951 | Anderson, Jr. | 250/86 |
| 2,139,797 | 12/1938 | Boerstler | 350/3 X |
| 3,224,266 | 12/1965 | Klippert | 73/150 |

OTHER PUBLICATIONS

" Atlas Fade–Ometers and Weather–Ometers," Atlas Electric Devices Co., Chicago, Ill., Copyright 1962, Pages 10 & 11.

*Primary Examiner*—William F. Lindquist
*Attorney*—Charles M. Hogan and Melvin E. Frederick

[57] ABSTRACT

This invention relates in general to an improved and efficient technique for providing ultra violet radiation and particularly to an apparatus which incorporates this ultra violet radiation as a source for testing color fastness or fading characteristics of various materials simulating the suns's properties. The ultra violet radiation is limited to a narrow effective region by the use of specially selected liquid and glass filters spaced from the light source.

6 Claims, 3 Drawing Figures

3,675,477

RICHARD A. ALLEN
INVENTOR.

BY Charles M. Hagan
Melvin E. Frederick

ATTORNEYS

RICHARD A. ALLEN
INVENTOR.

BY Charles M. Hogan
Melvin C. Fredericks

ATTORNEYS

TESTING METHOD AND DEVICE USING FILTERED ULTRA VIOLET RADIATION

The first fade measuring devices were developed in the early 1900's primarily for testing textile materials; however, shortly thereafter, others such as printing ink, paper product, and paint manufacturers began using the device to test the lightfastness properties of their products. At this point in the development of accelerated lightfastness testing, little thought was given to controlling the radiation, temperature, or humidity in the test chamber.

After several years it was discovered that the control of both the radiation and temperature in the test chamber played an important role in the end test results and thus the first serious effort was made to control these factors. Although humidity was known to play an important role in the end test result, it was not until the early 1950's that an automatic humidity control unit was introduced. Another fade producing factor involving contaminants, was developed in the 1960's and is now available on certain devices employing xenon arc lamps as the source of radiation.

Improved devices were developed as a result of the demand of some manufacturers to test their products under conditions similar to those encountered under actual out-of-door conditions. In the 1920's it was concluded that the addition of a water spray system to the test chamber of a fade measuring device would provide two of the basic elements which cause a breakdown in materials used under natural weather conditions. With the immediate success of these instruments came the request for a device to vary the test cycles to improve the over-all test results. The cycle meter or programming device was then developed to permit the user to perform various test cycles employing alternate periods of light, light and water spray, and water spray only.

It is known that accelerated tests can be made of fabrics and other materials as to resistance to fading and weathering. Such instruments may use an arc lamp emitting high intensity rays similar in wavelength to sunlight. It is common practice to utilize extremely high power lamps in these instruments. Since these high power lamps generate larger quantities of heat and infrared rays, often times these lamps produce charring or burning the material to be tested when the material is placed too close to the light source. The actual fading of the material, however, is attributable to the ultra violet rays (UV) between 3,000 and 4,000 angstroms (A). Other conditions also play a role such as relative humidity and sample temperature. In actual practice, the major source of such energy is sunlight, which as a white source emits energy at all wavelengths e.g.: ultra violet, visible, and infrared. Most fade measuring instruments attempt to simulate real world conditions by using white sources which simulate noon sunlight at some latitude and attempt to correlate results with the sunlight exposure times.

The major advantage of these instruments is that when they are located in a laboratory they are used to simulate actual conditions under controlled circumstances without being subject to the disadvantages of diurnal variations, changes in ambient conditions, while permitting 24 hour operation, as well as accelerating the fading process. The problem inherent in such devices is the tremendous amounts of radiative heat energy, which is developed and which limits how close the samples can be placed to the light source. If the test samples are overheated to the point where charring occurs, meaningless results are obtained. It is known that many devices or fade measuring instruments utilize various UV sources, such as sunlight, carbon arc lamps, xenon arc lamps, and UV lasers, but all are limited by either time necessary for exposure or they do not correlate with the sunlight UV spectrum. The heat generated by the source places a minimum time for exposure since the test sample will char if placed too close. It is known, however, that a UV source may be cooled by flowing a liquid, such as water to reduce such charring. This cooling method is limited though because it only removes the infrared radiation for wavelengths longer than 11,000A. approximately. This method of cooling only partially reduces the spurious or unwanted spectral frequencies emitted which will tend to heat up or char the specimen.

The invention hereinafter described circumvents most of those problems mentioned above by filtering the rays emitted by a high intensity source. The filter is selected so that only the most desirous UV radiation between 3,000 and 4,000 (A.) will impinge on the sample to be tested. This eliminates all the damaging infrared and visible energy. Further, the invention contemplates circulating a filter fluid which further reduces the heat radiation from the source. The invention, therefore, allows the material to be placed closer to the source. When the material is positioned close to the source, the amount of available radiant energy increases which in turn greatly accelerates the overall fading process. If the test time is reduced, testing of a large number of samples is reduced with consequent savings.

Accordingly, it is a primary object of this invention to provide an ultra violet source which simulates the sun's fading properties.

It is a further object of this invention to provide an ultra violet source between 3,000 and 4,000 (A.).

Yet another object of this invention is to utilize standard commercial light sources with a special filtering mechanism to match the fade measuring properties of the sun, while removing the damaging infrared and visible emissions.

Still another object of this invention is to provide an ultra violet source which will markedly accelerate fade measurements.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
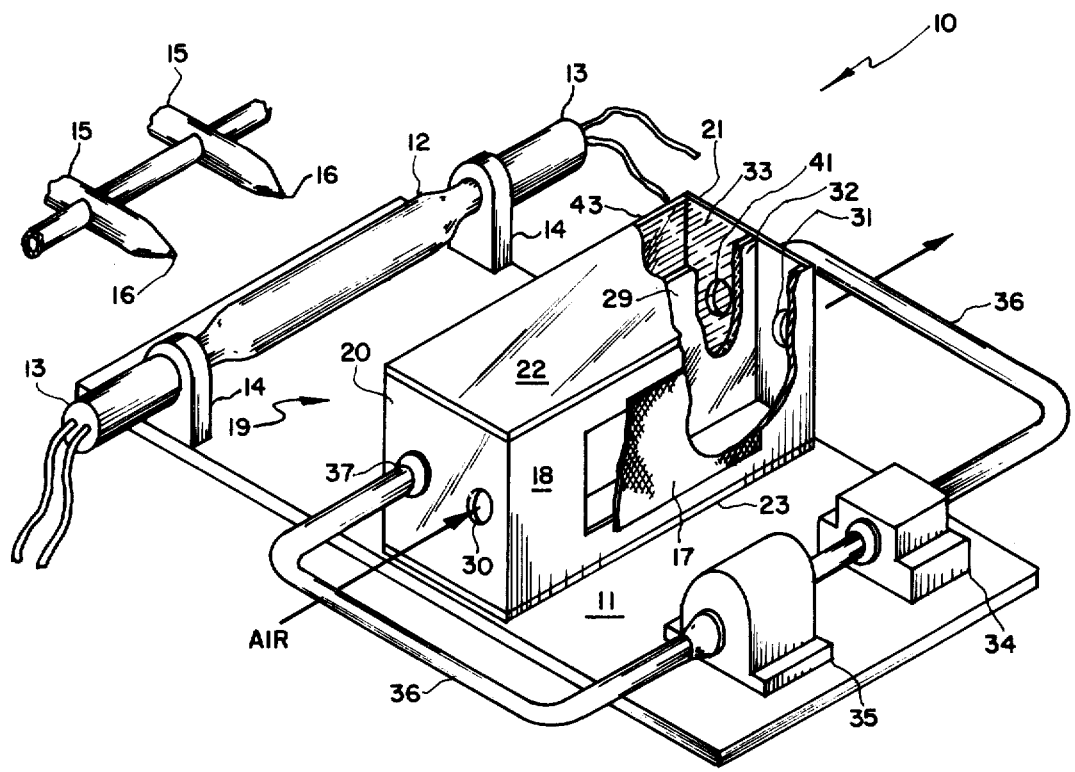
FIG. 1 is a perspective cut away view of the fade measuring device in accordance with the principles of the present invention.
Figure 2:
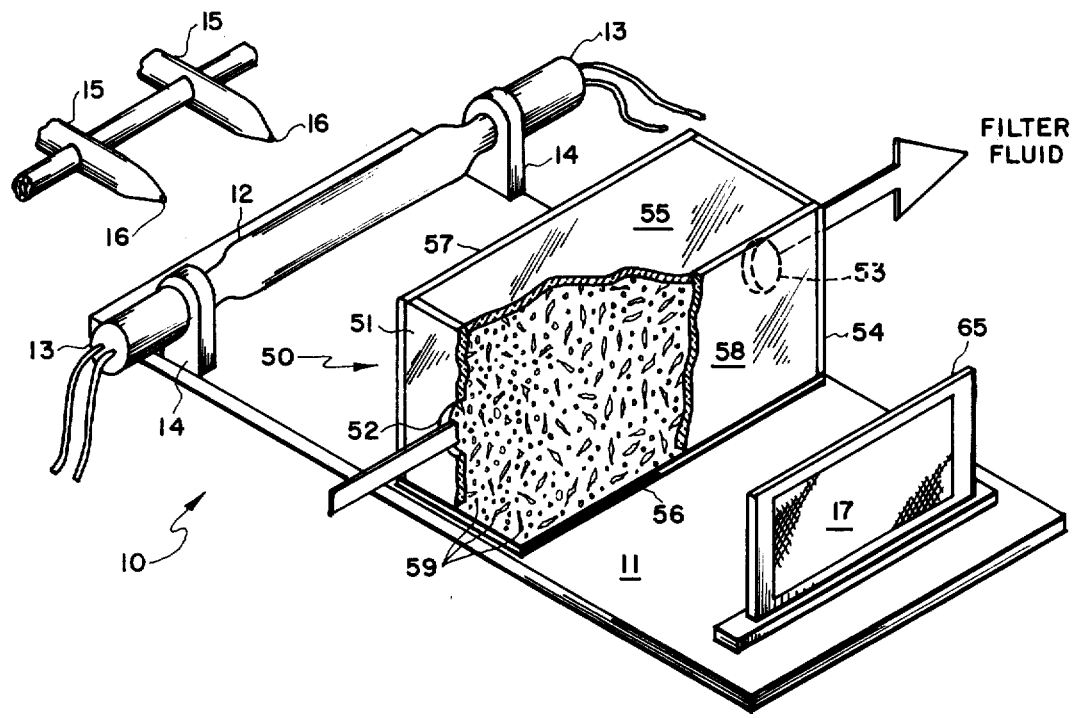
FIG. 2 is a perspective cut away view of an alternate arrangement that may be used in accordance with the principles of the present invention.

Attention is now directed to FIGS. 1 and 2 which illustrate respectively a preferred embodiment of the invention and an alternate arrangement. FIG. 1 indicates a fade simulation device generally designated by the numeral 10 which consists of a metallic base plate 11 structure which acts as a support for the component parts. The light source 12 is any commercially available source which emits in the ultra violet spectrum, such as carbon arc, xenon arc, and mercury arc lamps. However, the preferred embodiment includes a mercury arc lamp which is an efficient UV source. The light source is removably placed in a suitable socket 13 which is affixed by support rods 14 to base plate 11. The socket 13 is electrically connected to a conventional power source (not shown) which provides the necessary electrical energy to energize the light source. The light source may be conventionally cooled by a fluid which will conduct the heat away by convection. Such a cooling fluid may for example be compressed air, which may be supplied by a conventional pump (not shown) through pipes 15 with an outlet orifices 16.

The material or sample 17 to be tested for its fading properties is removably placed in a frame holder 18, a distance from the light source 12 and arranged so that it is perpendicular to a line parallel to the axis of the light source. The holder is shown by way of example as being permanently affixed to the treating fixture generally designated 19 in such a manner as not to impede the filtered ultra violet rays from the light source striking the sample 17 during its operation. The treating fixture 19 may be box shaped as shown in FIG. 1 which may be divided into two compartments 29 and 33. The sides of the box, 20 and 21, are provided with holes to allow fluid to pass into and out of the compartments. The top and bottom, 22 and 23, are permanently affixed to the sides to provide a leak proof seal for both compartments. As previously mentioned, the holder 18 forms the back portion of the treating fixture and first compartment 29. Air may be treated with moisture and supplied to the treating fixture via tubing (not shown) coupled to inlet port 30. The humidified air circulates in the first compartment 29 of the treating fixture and comes in contact with sample 17. The humidified air is then allowed to exit through exhaust port 31. This humidified air stimulates atmospheric conditions to which the sample may be exposed as well as assisting in cooling and weathering the sample.

Separating the two compartments is a permanently affixed leak proof glass filter 32. This filter is placed parallel and intermediate to both the sample and the axis of the light source in order to filter all light rays impinging on the sample. This filter 32 assists in limiting the amount of spurious and unwanted light rays from the light source as well as providing a leak proof structure to prevent the fluids in the two compartments from escaping. So far as known, preferred filtering materials are non heat resistant and must be cooled as explained hereinafter.

The second compartment 33 contains a filter fluid more fully described hereinafter which cools the filter 32, as well as filtering most of the undesirable light rays which are less than 3,000A. or greater than 4,000A . The filter fluid recirculates through the system through a conventional heat exchanger 34 and pump 35 through conventional tubing 36. The filter fluid is introduced into the second compartment 33 via an inlet hole 37. The filter fluid fills and circulates through this compartment which is intermediate the light source 12 and sample 17. The filter fluid exits then through outlet port 41 and returns via tubing 36 to the heat exchanger 34 and pump 35 to recirculate through the system. The front of the second compartment 33 is sealed by a heat resistant glass structure 43, such as Pyrex or quatz that will withstand the heat from light source 17. As can now be realized from the foregoing description, the light source 12 produces both desirable and undesirable light rays. These rays pass through the front wall 43, the filter fluid, the glass filter back wall 32, and the humidified air before impinging on the sample 17. The rays impinging on the sample are filtered to remove the heat producing wavelengths while allowing the fade producing wavelengths to pass. The sample may be removed after being exposed to the ultra violet radiation for a desired length of time and the exposure time is correlated with sun fading times.

Attention is now directed to FIG. 2 which illustrates a possible alternate method for causing tests samples of fabrics or material to be faded. This device operates in much the same manner as that device herein before discussed except that the filter fixture is a different construction here generally numerically designated as 50. This fixture may consist of a 6 sided structure constructed of heat resistant material such as Pyrex. This fixture 50 is placed intermediate the light source 12 and sample 17 to be tested and is substantially larger than the sample so that only filtered light will impinge on the sample. The treating fixture is placed parallel to both the light source and the sample for the most efficient operation. The filter box has a side plate 51 provided with inlet port 52 which allows the filter fluid to enter and circulate throughout the box. The fluid then passes out the filter box exit port hole 53 provided on side plate 54. The fluid is then recirculated through a heat exchanger by a pump (not shown). The filter box is a completely sealed and leak proof container consisting of side plates 51 and 54, top plate 55, bottom plate 56, front plate 57, and back plate 58. Both front plate 57 and back plate 58, should be constructed of good quality heat resistant glass such as Pyrex which will pass the light rays.

The treating fixture is filled with filter glass 59 either in crushed form as shown or in sheet members with holes provided so that the filtering fluid may circulate throughout and assist in cooling the filtering glass 59. The glass may consist of any standard filter material such as Corning 7-54 which will pass the preferred UV radiation and cut out the undesirable wavelengths. This type of filtering material is usually quite brittle and cannot withstand much thermal stress without fracturing, thus the need for circulation of filtering fluid that will absorb and dissipate the heat. The treating fixture 50 is disposed between the light source 12 and test sample 17 so that the fixture is in close proximity to the sample 17. This allows the filter box to absorb most if not all of the radiative and convective heat produced by the light source. It should be understood that both the arrangements discussed may be used albeit less efficiently without the solid filtering material.

Figure 3:
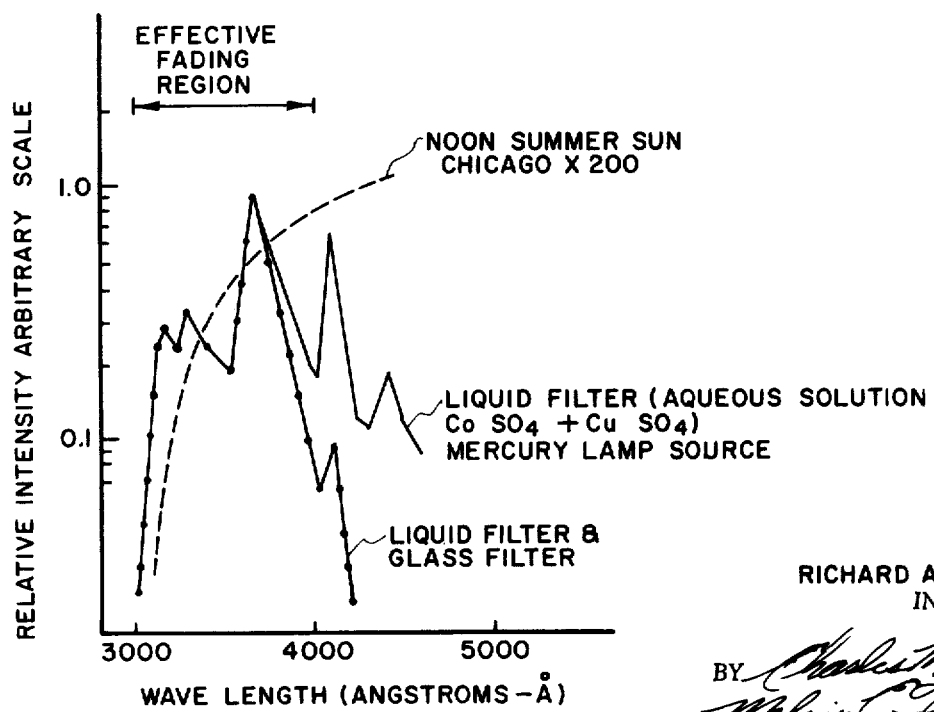
FIG. 3 is a graph indicating the correlation between sunlight properties and the results of tests made with the present invention.

One of the essential elements of this invention is, of course, the filtering system utilized which should have both good filtering and heat exchange properties. Therefore, attention is now directed to FIG. 3 wherein test results are shown in a graphical manner. The material used as a filter may be of any substance which will not pass light of less than a wavelength of 3,000A. or more than 4,000A. which is the effective fading region. Such a filter tested in the preferred embodiment was a liquid with the following composition: 1 gram $CuSO_4 \cdot 5H_2O$ and 2.5 grams $CoSO_4 \cdot 7H_2O$ in 10 cc of water. Other materials in solution which may be used are $NiSO_4$, $CoSO_4$, $CrK(SO_4)_2$, and $CuSO_4$. The use of a solution containing $CuSO_4$ and $CoSO_4$ proved to be the most satisfactory filter fluid since it has a band pass as shown in FIG. 3 from 3,000 to 4,500A . This allowed the preferred UV rays in the effective region which is between 3,000 and 4,000A. to pass without much reduction in energy while cancelling most of the visible and infrared spectrum. These results correlated well with the sunlight spectrum in that region as shown in FIG. 3. The system may be further improved if a glass filter such as Corning 7-54 is used in conjunction with the liquid filter which will further restrict the band pass of the system to the effective 3,000 to 4,000A. region as shown in FIG. 3 by providing a sharper cut off at 4000A . However, as previously mentioned glass filters of this type usually are quite brittle and fracture when exposed directly to heat rays of a high intensity source. Therefore, these filters must be cooled by a manner similar to that which is taught by this invention.

It should also be understood that limiting the UV to only the effective region will assist in cooling the sample to be tested by eliminating the radiative heat caused by the infrared energy. The convective currents adjacent to the treating fixture are believed will further assist the cooling of the sample. This cooling process may be enhanced by circulating very cold filter fluid or by placing air jets in the vicinity of the sample. Since the sample is not exposed to the intense heat and infrared radiation it may be moved closer to the light source without risk of charring. It is well understood in the art that a test sample closer to the source will receive a greater amount of energy from the source. Therefore, samples placed in closer proximately to the source which this invention makes possible will fade at a more rapid rate than samples in more conventional systems. Further, the results obtained from such an invention correlate well with the sunlight spectrum which provides a means for predicting the material fading or weathering characteristics.

While there has been shown what is at present considered to be the preferred embodiment of the invention, it will be understood by those skilled in the art that various changes and modifications may be made in the preferred apparatus and method departing from the proper scope of the invention as claimed in the appended claim.

Having disclosed my invention, I claim:

1. The method of fading material by selected ultraviolet radiation which comprises the steps of:
   a. Generating light including ultraviolet radiation;
   b. Passing said light through a filter system including a solid and liquid to provide radiation of greater than about 3,000A. and less than about 4,000A., said liquid being an aqueous solution including $CoSO_4$ and $CuSO_4$;
   c. Removing heat from the system by circulating said liquid through a heat exchanger; and
   d. Positioning the sample to be treated close to the said filtering system, said filtering system being spaced away from the source of said ultraviolet radiation and disposed intermediate said source and said sample.

2. The method of fading material in accordance with claim 1 in which the aqueous solution comprises 1 gram $CuSO_4 \cdot 5H_2O$ and 2.5 grams $CoSO_4 \cdot 7H_2O$ per 10 cc of water.

3. The method of fading material in accordance with claim 1 in which the solid filter is comminuted and said aqueous solution is flowed over, around, and between said comminuted filter.

4. In an apparatus for testing the color-fastness of a sample the combination comprising;
 a. means for providing a source of ultra violet radiation;
 b. Container means adapted to receive said ultra violet radiation and disposed adjacent and spaced away from said source, said container means comprising a first wall which is exposed to said source and a second wall, said walls being substantially transparent to ultra violet radiation;
 c. Filtering means including solid filtering means and liquid filtering means intermediate and substantially filling the spaces between said first and second walls, said liquid comprising an aqueous solution of $CoSO_4$ and $CuSO_4$, said liquid and solid filter limiting the ultra violet radiation passing through said container to a wavelength greater than about 3,000A. and less than about 4,000A., said liquid additionally cooling said first and second walls;
 d. Means for circulating said liquid through said container to remove heat from said apparatus; and
 e. means for holding a sample to be tested disposed adjacent to said second wall that is remote from the source, said holder being exposed to the filtered radiation which has a wavelength greater than about 3,000A. and less than about 4,000A.

5. Apparatus in accordance with claim 4 and additionally including particles of glass filter means disposed in and substantially filling the portion of said container means adapted to receive said liquid whereby the said liquid is flowed around and cools said particles, said particles and liquid providing a band pass of ultra violet radiation wavelength of about 3,000 to 4,000A. and thereby assist in limiting said ultra violet radiation to an effective fading region.

6. Apparatus in accordance with claim 4 in which said aqueous solution comprises 1 gram $CuSO_4 \cdot 5H_2O$ and 2.5 grams $CoSO_4 \cdot 7H_2O$ per 10 cc of water.

* * * * *